United States Patent
Zhao et al.

(10) Patent No.: US 10,669,126 B2
(45) Date of Patent: Jun. 2, 2020

(54) FIBER BELT FOR ELEVATOR SYSTEM

(71) Applicant: Otis Elevator Company, Farmington, CT (US)

(72) Inventors: Wenping Zhao, Glastonbury, CT (US); Daniel A. Mosher, Glastonbury, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 246 days.

(21) Appl. No.: 15/687,790

(22) Filed: Aug. 28, 2017

(65) Prior Publication Data

US 2019/0062117 A1 Feb. 28, 2019

(51) Int. Cl.
*B66B 7/06* (2006.01)
*D07B 5/04* (2006.01)
*F16G 1/08* (2006.01)
*F16G 1/16* (2006.01)

(52) U.S. Cl.
CPC ............... *B66B 7/062* (2013.01); *D07B 5/04* (2013.01); *F16G 1/08* (2013.01); *F16G 1/16* (2013.01); *D07B 2501/2007* (2013.01); *D10B 2321/021* (2013.01); *D10B 2321/022* (2013.01); *D10B 2331/02* (2013.01); *D10B 2331/04* (2013.01); *D10B 2331/10* (2013.01); *D10B 2403/033* (2013.01)

(58) Field of Classification Search
CPC ................................. B66B 7/062; D01B 1/16
See application file for complete search history.

(56) References Cited

U.S. PATENT DOCUMENTS 4,887,422 A * 12/1989 Klees ..................... D07B 1/025
57/220
5,084,221 A * 1/1992 Matsuno ................. B29C 53/14
264/103

(Continued)

FOREIGN PATENT DOCUMENTS

CN 104192675 A 12/2014
CN 104528498 A 4/2015
(Continued)

OTHER PUBLICATIONS

European Search Report Issued in EP Application No. 18190850.0; dated Jan. 4, 2019; 8 Pages.

*Primary Examiner* — Minh Truong
(74) *Attorney, Agent, or Firm* — Cantor Colburn LLP

(57) ABSTRACT

A belt for an elevator system includes one or more tension members arranged along a belt width and extending longitudinally along a length of the belt, each tension member including a plurality of fibers extending along the belt length. A jacket material at least partially encapsulates the plurality of tension members. An elevator system includes a hoistway, an elevator car located in the hoistway and movable therein, and a belt operably connected to the elevator car to suspend and/or drive the elevator car along the hoistway. The belt includes one or more tension members arranged along a belt width and extending longitudinally along a length of the belt, each tension member including a plurality of fibers extending along the belt length. A jacket material at least partially encapsulates the plurality of tension members.

15 Claims, 6 Drawing Sheets

(56) References Cited

U.S. PATENT DOCUMENTS

| | | | | |
|---|---|---|---|---|
| 6,164,053 | A * | 12/2000 | O'Donnell | B66B 7/06 187/251 |
| 6,295,799 | B1 * | 10/2001 | Baranda | B66B 7/062 57/221 |
| 8,673,433 | B2 | 3/2014 | Reif et al. | |
| 9,051,651 | B2 * | 6/2015 | Veronesi | B66B 7/06 |
| 9,074,318 | B2 * | 7/2015 | Chou | D07B 1/142 |
| 9,126,805 | B2 | 9/2015 | Pelto-Huikko et al. | |
| 9,550,653 | B2 | 1/2017 | Wesson et al. | |
| 2007/0044991 | A1 * | 3/2007 | Varkey | H01B 7/046 174/102 R |
| 2010/0133046 | A1 * | 6/2010 | Allwardt | B66B 7/08 187/251 |
| 2010/0267863 | A1 * | 10/2010 | Furusawa | D02G 3/447 523/200 |
| 2011/0259677 | A1 | 10/2011 | Dudde et al. | |
| 2013/0171463 | A1 * | 7/2013 | Chang | B66B 7/062 428/549 |
| 2014/0008154 | A1 * | 1/2014 | Wesson | B66B 7/062 187/254 |
| 2015/0015280 | A1 * | 1/2015 | Guilani | D07B 1/145 324/699 |
| 2015/0101888 | A1 | 4/2015 | Pelto-Huikko | |
| 2015/0191332 | A1 | 7/2015 | Kere | |
| 2015/0307321 | A1 | 10/2015 | Breite | |
| 2017/0043978 | A1 | 2/2017 | Valjus | |
| 2017/0066630 | A1 | 3/2017 | Gurvich et al. | |

FOREIGN PATENT DOCUMENTS

| | | |
|---|---|---|
| CN | 105672009 A | 6/2016 |
| CN | 106192494 A | 12/2016 |
| EP | 2361212 A1 | 8/2011 |
| EP | 2913288 A1 | 9/2015 |
| WO | 2004037702 A1 | 5/2004 |
| WO | 20110128223 A2 | 10/2011 |
| WO | 2016030298 A1 | 3/2016 |
| WO | 2017155943 A1 | 9/2017 |

* cited by examiner

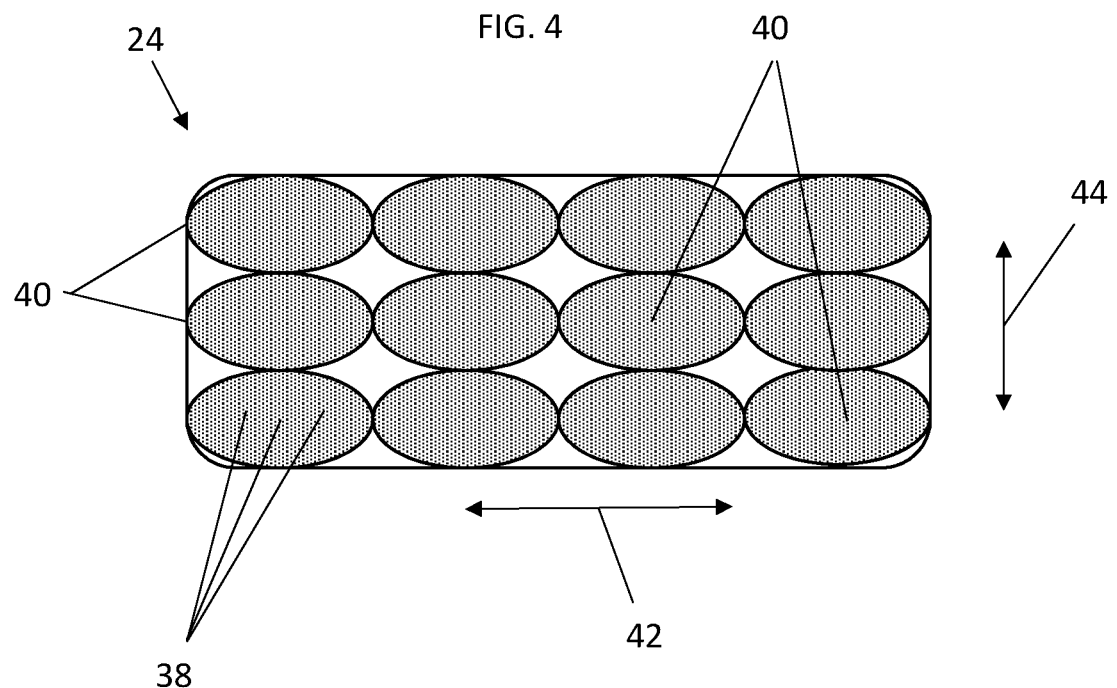
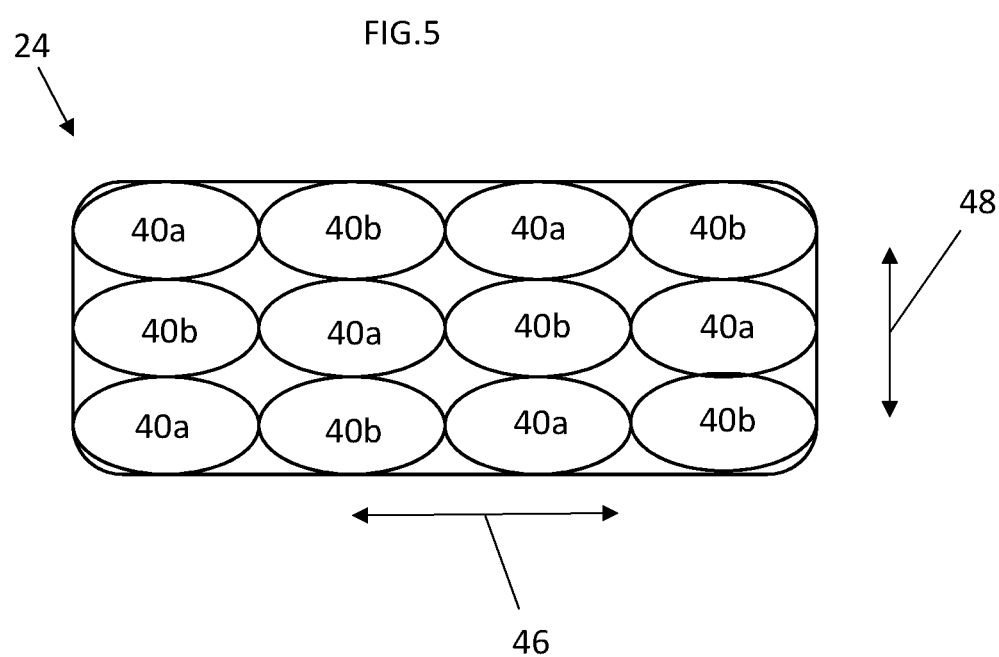

FIBER BELT FOR ELEVATOR SYSTEM

BACKGROUND

Embodiments disclosed herein relate to elevator systems, and more particularly to load bearing members to suspend and/or drive elevator cars of an elevator system.

Elevator systems are useful for carrying passengers, cargo, or both, between various levels in a building. Some elevators are traction based and utilize load bearing members such as belts for supporting the elevator car and achieving the desired movement and positioning of the elevator car.

Where a belt is used as a load bearing member, a plurality of tension members are embedded in a common jacket. The jacket retains the tension members in desired positions and provides a frictional load path. In an exemplary traction elevator system, a machine drives a traction sheave with which the belts interact to drive the elevator car along a hoistway. Belts typically utilize tension members formed from steel elements, but alternatively may utilize tension members formed from fibers impregnated with a thermoset resin and heat-cured to form a composite tension member. The composite tension member, however, is generally highly rigid, costly, and is only useful in limited elevator system applications.

BRIEF DESCRIPTION

In one embodiment, a belt for an elevator system includes one or more tension members arranged along a belt width and extending longitudinally along a length of the belt, each tension member including a plurality of fibers extending along the belt length. A jacket material at least partially encapsulates the plurality of tension members.

Additionally or alternatively, in this or other embodiments the plurality of fibers extend unidirectionally along the belt length.

Additionally or alternatively, in this or other embodiments an interlayer is located between a tension member of the one or more tension members and the jacket material.

Additionally or alternatively, in this or other embodiments the interlayer substantially envelops the tension member of the one or more tension members.

Additionally or alternatively, in this or other embodiments the interlayer is configured to promote adhesion between the jacket material and the tension member of the one or more tension members.

Additionally or alternatively, in this or other embodiments the interlayer is configured to provide lubrication to the tension member of the one or more tension members.

Additionally or alternatively, in this or other embodiments the interlayer includes a first interlayer portion configured to promote adhesion between the jacket material and the tension member of the one or more tension members, and a second interlayer portion configured to provide lubrication to the tension member of the one or more tension members.

Additionally or alternatively, in this or other embodiments the tension member includes two or more tension member layers, and the interlayer is disposed between adjacent tension member layers of the two or more tension member layers.

Additionally or alternatively, in this or other embodiments the interlayer is formed from a material different from the jacket material.

Additionally or alternatively, in this or other embodiments the one or more tension members are formed absent an impregnated resin matrix material.

Additionally or alternatively, in this or other embodiments the fibers are formed into a plurality of fiber tows, which are formed into the one or more tension members.

Additionally or alternatively, in this or other embodiments a first fiber tow of the tension member is formed from a first material and a second fiber tow of the tension member is formed from a second material different from the first material.

Additionally or alternatively, in this or other embodiments the jacket material is selected from the group consisting of polyurethanes, polyesters, ethylene propylene diene elastomer, chloroprene, chlorosulfonyl polyethylene, ethylene vinyl acetate, polyamide, polypropylene, butyl rubber, acrylonitrile butadiene rubber, styrene butadiene rubber, acrylic elastomer, fluoroelastomer, silicone elastomer, polyolefin elastomer, styrene block and diene elastomer, natural rubber, or combinations thereof.

In another embodiment, an elevator system includes a hoistway, an elevator car located in the hoistway and movable therein, and a belt operably connected to the elevator car to suspend and/or drive the elevator car along the hoistway. The belt includes one or more tension members arranged along a belt width and extending longitudinally along a length of the belt, each tension member including a plurality of fibers extending along the belt length. A jacket material at least partially encapsulates the plurality of tension members.

Additionally or alternatively, in this or other embodiments the plurality of fibers extend unidirectionally along the belt length.

Additionally or alternatively, in this or other embodiments an interlayer is located between a tension member of the one or more tension members and the jacket material.

Additionally or alternatively, in this or other embodiments the interlayer substantially envelops the tension member of the one or more tension members.

Additionally or alternatively, in this or other embodiments the tension member includes two or more tension member layers, and the interlayer is disposed between adjacent tension member layers of the two or more tension member layers.

Additionally or alternatively, in this or other embodiments the one or more tension members are formed absent an impregnated resin matrix material.

Additionally or alternatively, in this or other embodiments the fibers are formed into a plurality of fiber tows, which are formed into the one or more tension members.

BRIEF DESCRIPTION OF THE DRAWINGS

The following descriptions should not be considered limiting in any way. With reference to the accompanying drawings, like elements are numbered alike:

FIG. 4 is a schematic cross-sectional view of an embodiment of a tension member for an elevator belt;

FIG. 5 is a schematic cross-sectional view of another embodiment of a tension member for an elevator belt;

DETAILED DESCRIPTION

A detailed description of one or more embodiments of the disclosed apparatus and method are presented herein by way of exemplification and not limitation with reference to the Figures.

Figure 1:
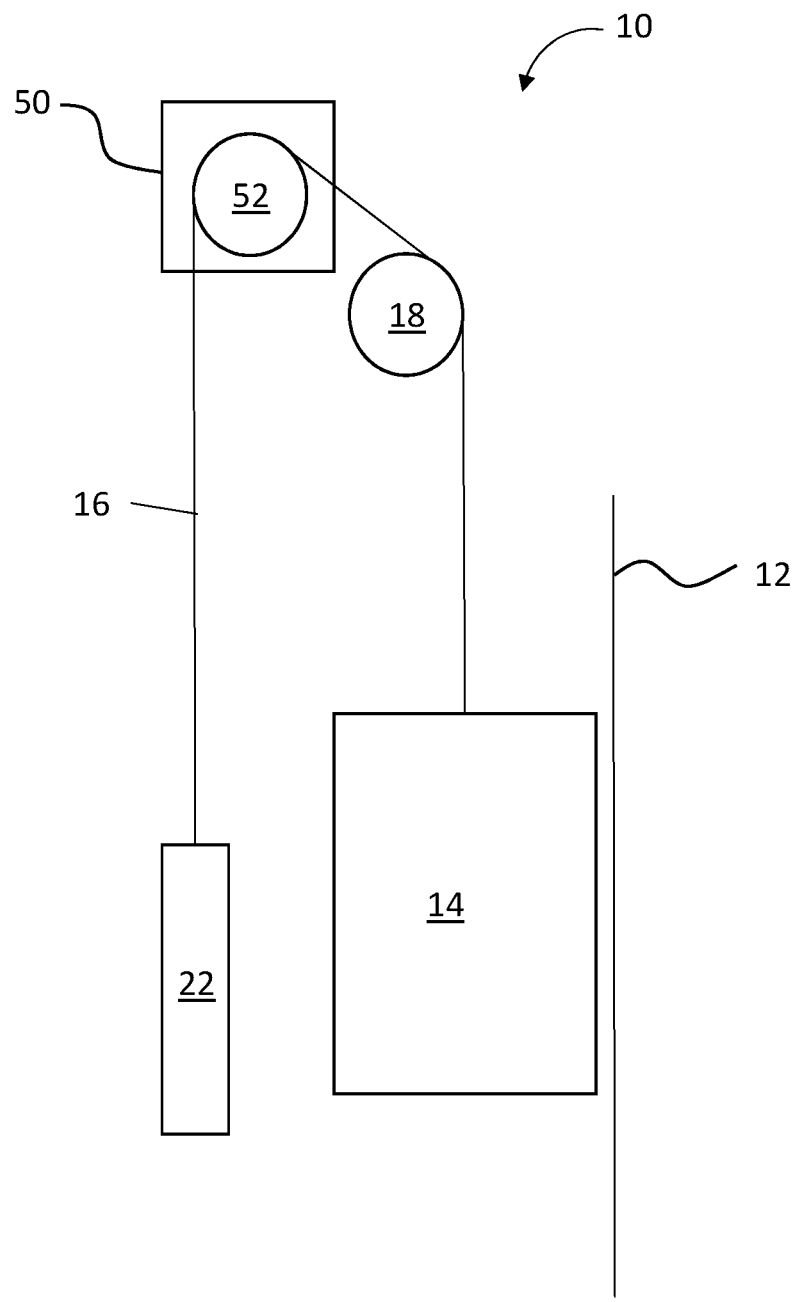
FIG. 1 is a schematic illustration of an embodiment of an elevator system.

Shown in FIG. 1, is a schematic view of an exemplary traction elevator system 10. Features of the elevator system 10 that are not required for an understanding of the present invention (such as the guide rails, safeties, etc.) are not discussed herein. The elevator system 10 includes an elevator car 14 operatively suspended or supported in a hoistway 12 with one or more belts 16. The one or more belts 16 interact with sheaves 18 and 52 to be routed around various components of the elevator system 10. Sheave 18 is configured as a diverter, deflector or idler sheave and sheave 52 is configured as a traction sheave 52, driven by a machine 50. Movement of the traction sheave 52 by the machine 50 drives, moves and/or propels (through traction) the one or more belts 16 that are routed around the traction sheave 52. Diverter, deflector or idler sheaves 18 are not driven by a machine 50, but help guide the one or more belts 16 around the various components of the elevator system 10. The one or more belts 16 could also be connected to a counterweight 22, which is used to help balance the elevator system 10 and reduce the difference in belt tension on both sides of the traction sheave during operation. The sheaves 18 and 52 each have a diameter, which may be the same or different from each other.

In some embodiments, the elevator system 10 could use two or more belts 16 for suspending and/or driving the elevator car 14 In addition, the elevator system 10 could have various configurations such that either both sides of the one or more belts 16 engage the sheaves 18, 52 or only one side of the one or more belts 16 engages the sheaves 18, 52. The embodiment of FIG. 1 shows a 1:1 roping arrangement in which the one or more belts 16 terminate at the car 14 and counterweight 22, while other embodiments may utilize other roping arrangements.

The belts 16 are constructed to meet belt life requirements and have smooth operation, while being sufficiently strong to be capable of meeting strength requirements for suspending and/or driving the elevator car 14 and counterweight 22.

Figure 2:
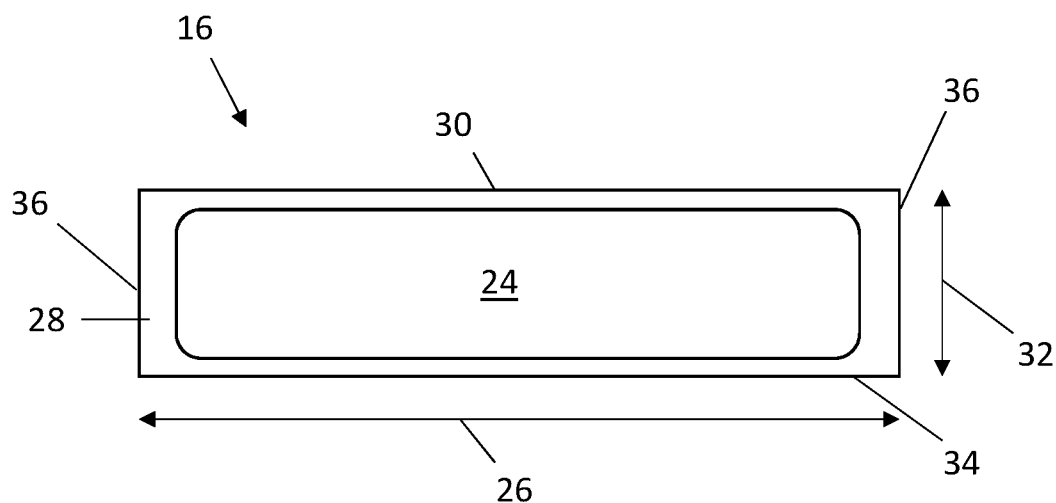
FIG. 2 is a schematic cross-sectional view of an embodiment of an elevator belt.

FIG. 2 provides a cross-sectional schematic of an exemplary belt 16 construction or design. The belt 16 includes one or more tension members 24 extending longitudinally along the belt 16 and arranged across a belt width 26. The tension members 24 are at least partially enclosed in a jacket material 28 to restrain movement of the tension members 24 in the belt 16 and to protect the tension members 24. The jacket material 28 defines a traction side 30 configured to interact with a corresponding surface of the traction sheave 52. Exemplary materials for the jacket material 28 include the elastomers of thermoplastic and thermosetting polyurethanes, thermoplastic polyester elastomers, ethylene propylene diene elastomer, chloroprene, chlorosulfonyl polyethylene, ethylene vinyl acetate, polyamide, polypropylene, butyl rubber, acrylonitrile butadiene rubber, styrene butadiene rubber, acrylic elastomer, fluoroelastomer, silicone elastomer, polyolefin elastomer, styrene block and diene elastomer, natural rubber, or combinations thereof.

Other materials may be used to form the jacket material 28 if they are adequate to meet the required functions of the belt 16. For example, a primary function of the jacket material 28 is to provide a sufficient coefficient of friction between the belt 16 and the traction sheave 52 to produce a desired amount of traction therebetween. The jacket material 28 should also transmit the traction loads to the tension members 24. In addition, the jacket material 28 should be wear resistant and protect the tension members 24 from impact damage, exposure to environmental factors, such as chemicals, for example.

Figure 2A:
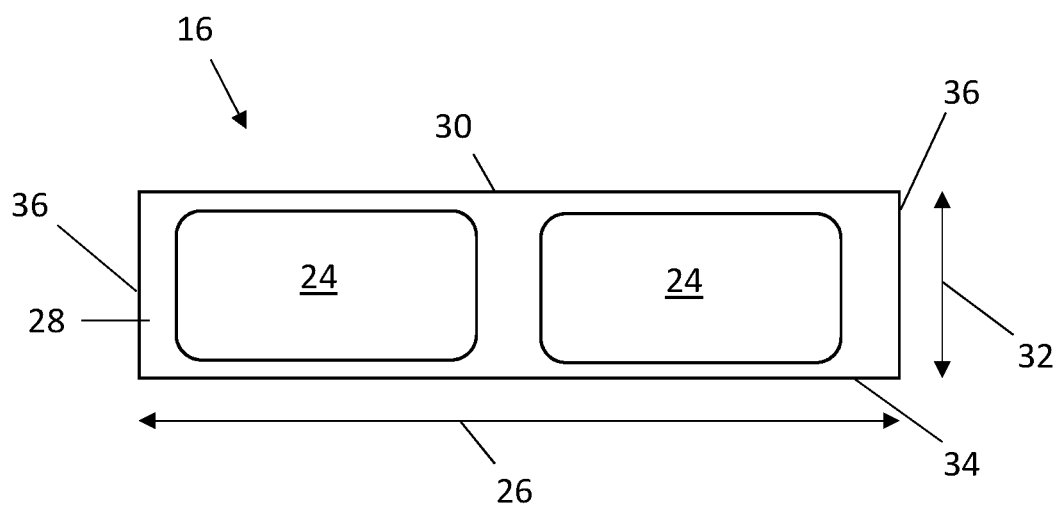
FIG. 2A is a schematic cross-sectional view of another embodiment of an elevator belt.
Figure 2B:
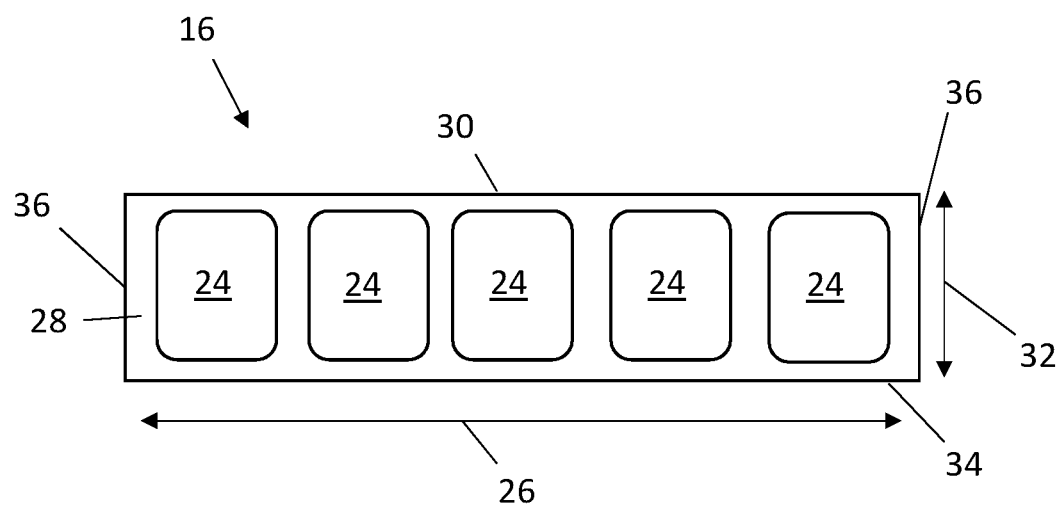
FIG. 2B is a schematic cross-sectional view of yet another embodiment of an elevator belt.
Figure 3:
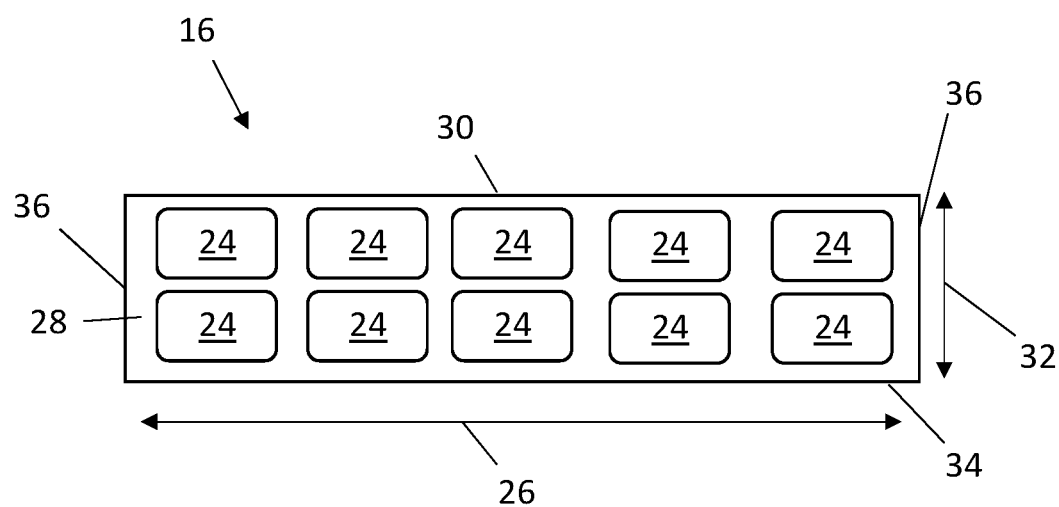
FIG. 3 is a schematic cross-sectional view of still another embodiment of an elevator belt.

The belt 16 has a belt width 26 and a belt thickness 32, with an aspect ratio of belt width 26 to belt thickness 32 greater than one. The belt 16 further includes a back side 34 opposite the traction side 30 and belt edges 36 extending between the traction side 30 and the back side 34. In some embodiments, such as shown in FIG. 2, the belt 16 has one tension member 24, while in other embodiments, such as shown in FIGS. 2A and 2B, two or more tension members 24 may be utilized. Further, as shown in FIG. 3, the tension members 24 may not only be arrayed along the belt width 26, but may also be arrayed along the belt thickness 32, defining rows and columns of tension members 24.

Referring now to FIG. 4, each tension member 24 is formed from a plurality of tension fibers 38 arranged into groups or tows 40. The tows 40 may be arrayed along a tension member width 46 and/or across a tension member thickness 48. The tension fibers 38 extend unidirectionally along the tension member 24 length, which corresponds to the belt 16 length. In other embodiments, the tension fibers 38 may include tension fibers 38 extending along the tension member 24 length, and tension fibers 38 (cross-fibers) extending at a nonzero angle to the tension member 24 length. Further, the tension fibers 38 may be twisted to form a cord. The tension fibers 38 may be, for example, Vectran®, Kevlar®, or high-density polyethelyne (HDPE) fibers. Further, the tension member 24 may be constructed utilizing two or more different tension fiber 38 materials. For example, as shown in FIG. 5, a first tow 40a may be a group of tension fibers 38 of a first material, while a second tow 40b may be a group of tension fibers 38 of a second material. The tows 40a and 40b may be arranged in an alternating pattern as shown in FIG. 5 to form tension member 24, or may be arranged in another pattern or random arrangement to meet selected requirements of the tension member 24 and/or of the belt 16.

The tension members 24 are formed by "dry" tension fibers 38, in which the tension members 24 are absent an impregnated resin matrix material. The jacket material 28 retains the tension members 24 and protects the tension members 24, improving the belt 16 durability. The jacket material 28 further retains the tension fibers 38 and tows 40 in a desired position and arrangement in the belt 16.

Figure 6:
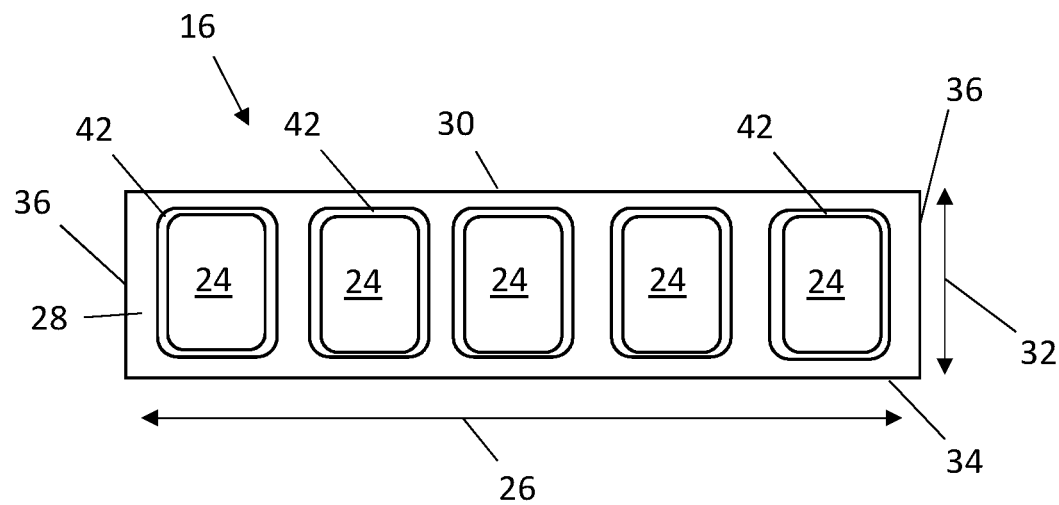
FIG. 6 is a schematic cross-sectional view of an embodiment of an elevator belt including an interlayer.

Referring now to FIG. 6, in some embodiments, an inter-layer 42 is utilized between the tension member 24 and the jacket material 28. In some embodiments, the inter-layer 42 encloses or envelops the tension member 24. The inter-layer 42 may serve one or more functions in the belt 16. For example, the inter-layer 42 may be utilized to improve adhesion between the jacket material 28 and the tension member 24, or may be utilized to provide lubrication to the tension member 24 and the tension fibers 38. The inter-layer 42 is formed from a material different from the jacket material 28, such as from a latex material or a relatively low-temperature TPU material, as compared to the jacket material 28. The inter-layer 42 is non-rigid, and may be applied to the tension members 24 via, for example, a layer co-extruded with the jacket material 28, as a film, as a spray, or by a brush or roller process on the tension member 24 surface. In some embodiments, two or more inter-layers 42 may be utilized. For example, a first inter-layer 42 may have an affinity to the jacket material 28 and may be utilized primarily to promote adhesion between the tension member 24 and the jacket material 28, and a second inter-layer 42 may be utilized primarily to promote lubrication of the tension fibers 38.

Figure 7:
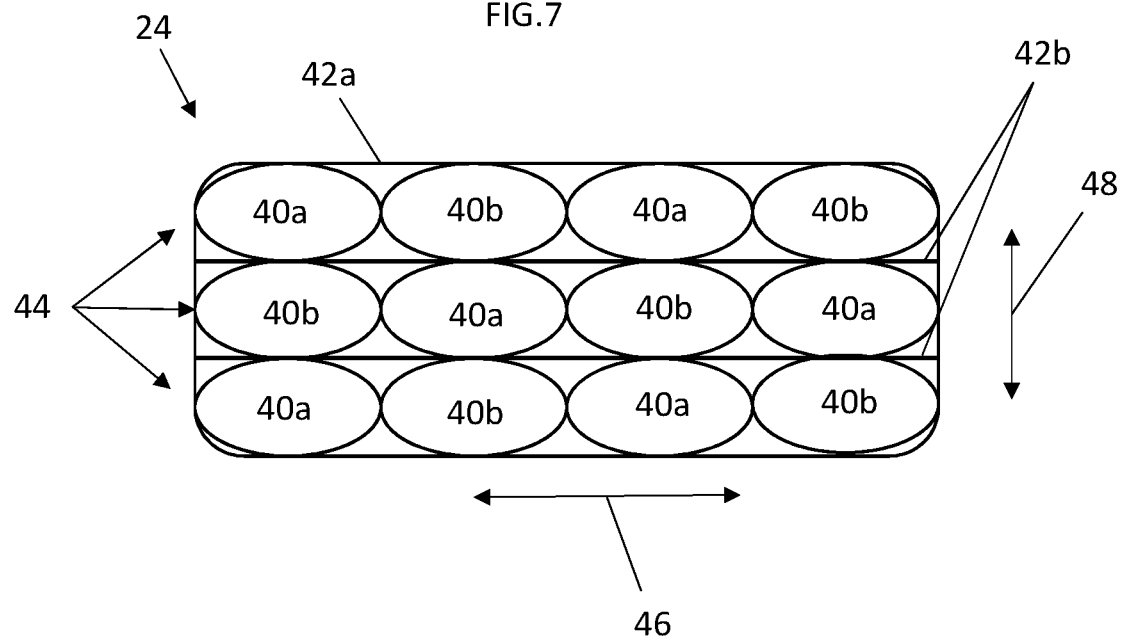
FIG. 7 is a schematic cross-sectional view of an embodiment of a tension member for an elevator belt including an interlayer.
Figure 8:
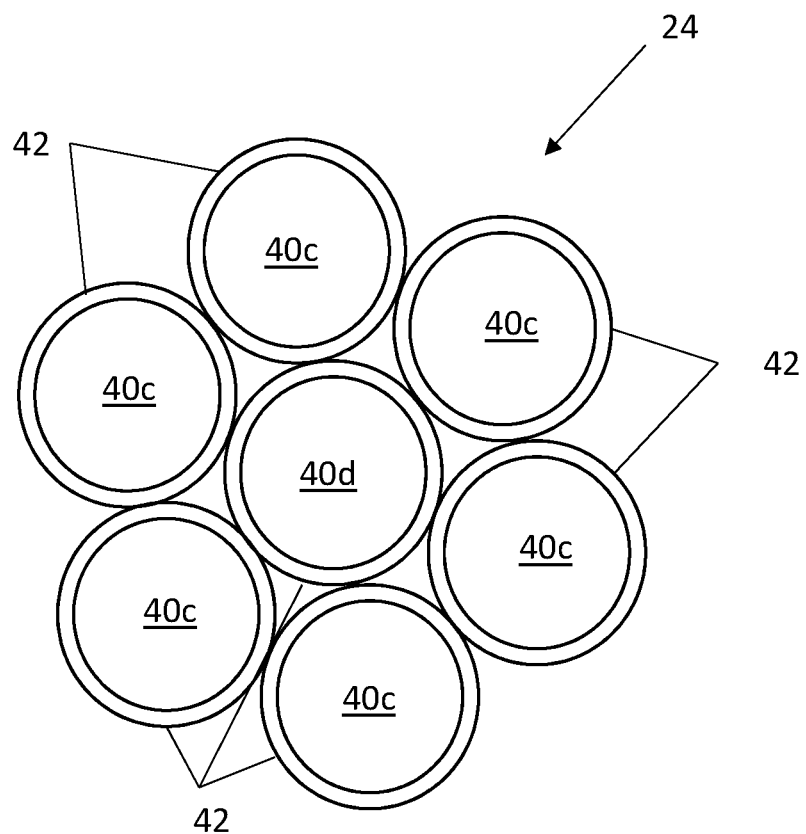
FIG. 8 is a schematic cross-sectional view of another embodiment of a tension member for an elevator belt including an interlayer.

In other embodiments, such as shown in FIG. 7, the first inter-layer 42a is disposed at an exterior surface of the tension member 24, to promote adhesion of the jacket material 28 with the tension member 24. The second inter-layer 42b is disposed between adjacent tension member layers 44 of the tension member 24 to provide lubrication to the tension member 24. Referring now to FIG. 8, in some embodiments, the tension member 24 includes a plurality of outer tows 40c wrapped around a center tow 40d. Further, an inter-layer 42 may be wrapped around each of the outer tows 40c and the center tow 40d.

Utilizing the tension fibers 38 without the resin matrix material provides a simple tension member construction, when compared to composite tension members, with improved flexibility and resistance to splitting, and results in a lighter weight and lower cost belt.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A belt for an elevator system, comprising:
   one or more tension members arranged along a belt width and extending longitudinally along a length of the belt, each tension member including a plurality of fibers extending along the belt length; and
   a jacket material at least partially encapsulating the plurality of tension members;
   wherein the plurality of fibers are synthetic fibers and the tension members are formed absent an impregnated resin matrix material; wherein the fibers are formed into a plurality of fiber tows, which are formed into the one or more tension members; and wherein a first fiber tow of the tension member is formed from a first material and a second fiber tow of the tension member is formed from a second material different from the first material.

2. The belt of claim 1, wherein the plurality of fibers extend unidirectionally along the belt length.

3. The belt of claim 1, further comprising an interlayer disposed between a tension member of the one or more tension members and the jacket material.

4. The belt of claim 3, wherein the interlayer substantially envelops the tension member of the one or more tension members.

5. The belt of claim 3, wherein the interlayer is configured to promote adhesion between the jacket material and the tension member of the one or more tension members.

6. The belt of claim 3, wherein the interlayer is configured to provide lubrication to the tension member of the one or more tension members.

7. The belt of claim 3, wherein the interlayer includes:
   a first interlayer portion configured to promote adhesion between the jacket material and the tension member of the one or more tension members; and
   a second interlayer portion configured to provide lubrication to the tension member of the one or more tension members.

8. The belt of claim 3, wherein the tension member includes two or more tension member layers, and the interlayer is disposed between adjacent tension member layers of the two or more tension member layers.

9. The belt of claim 3, wherein the interlayer is formed from a material different from the jacket material.

10. The belt of claim 1, wherein the jacket material is selected from the group consisting of polyurethanes, polyesters, ethylene propylene diene elastomer, chloroprene, chlorosulfonyl polyethylene, ethylene vinyl acetate, polyamide, polypropylene, butyl rubber, acrylonitrile butadiene rubber, styrene butadiene rubber, acrylic elastomer, fluoroelastomer, silicone elastomer, polyolefin elastomer, styrene block and diene elastomer, natural rubber, or combinations thereof.

11. An elevator system, comprising:
   a hoistway;
   an elevator car disposed in the hoistway and movable therein; and
   a belt operably connected to the elevator car to suspend and/or drive the elevator car along the hoistway, the belt including:
   one or more tension members arranged along a belt width and extending longitudinally along a length of the belt, each tension member including a plurality of fibers extending along the belt length; and
   a jacket material at least partially encapsulating the plurality of tension members;
   wherein the plurality of fibers are synthetic fibers and the tension members are formed absent an impregnated resin matrix material; wherein the fibers are formed into a plurality of fiber tows, which are formed into the one or more tension members; and wherein a first fiber tow of the tension member is formed from a first material and a second fiber tow of the tension member is formed from a second material different from the first material.

12. The elevator system of claim 11, wherein the plurality of fibers extend unidirectionally along the belt length.

13. The elevator system of claim 11, further comprising an interlayer disposed between a tension member of the one or more tension members and the jacket material.

14. The elevator system of claim 13, wherein the interlayer substantially envelops the tension member of the one or more tension members.

15. The elevator system of claim 13, wherein the tension member includes two or more tension member layers, and the interlayer is disposed between adjacent tension member layers of the two or more tension member layers.

* * * * *